United States Patent
Wang et al.

(10) Patent No.: US 7,207,722 B2
(45) Date of Patent: Apr. 24, 2007

(54) COMBINED BEARING

(75) Inventors: Chin-Lung Wang, Tu-Chen (TW); Gwo-Yan Huang, Tu-chen (TW); Shang-Yi Chou, Tu-Chen (TW); Yan-Li Xu, Shenzhen (CN); Wu-Kuang Chen, Tu-chen (TW); Chih-Chien Hung, Tu-chen (TW)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 530 days.

(21) Appl. No.: 10/636,139

(22) Filed: Aug. 6, 2003

(65) Prior Publication Data
US 2005/0025407 A1  Feb. 3, 2005

(30) Foreign Application Priority Data
Oct. 11, 2002  (TW) .............................. 91216190 U

(51) Int. Cl.
*F16C 33/24* (2006.01)

(52) U.S. Cl. .................... 384/276; 384/282; 384/907.1

(58) Field of Classification Search ............... 384/276, 384/282, 297, 907.1, 913
See application file for complete search history.

(56) References Cited

U.S. PATENT DOCUMENTS

| | | | | |
|---|---|---|---|---|
| 1,787,810 A | * | 1/1931 | Bigelow et al. ............ | 384/297 |
| 3,081,644 A | * | 3/1963 | Hudgens et al. ........... | 74/89.42 |
| 3,170,337 A | * | 2/1965 | Linley, Jr. .................. | 74/89.42 |
| 3,592,518 A | * | 7/1971 | Pfister et al. ............... | 384/219 |
| 3,938,868 A | | 2/1976 | VanWyk | |
| 5,083,873 A | | 1/1992 | Momose et al. | |
| 5,135,314 A | * | 8/1992 | Momose et al. ........... | 384/275 |
| 5,174,660 A | * | 12/1992 | Seibig ........................ | 384/420 |
| 5,505,546 A | * | 4/1996 | Okude ........................ | 384/428 |
| 6,073,537 A | * | 6/2000 | Noda et al. ................. | 92/31 |
| 6,254,348 B1 | | 7/2001 | Lee | |
| 6,840,677 B2 | * | 1/2005 | Chen et al. ................. | 384/397 |
| 6,942,388 B2 | * | 9/2005 | Chang et al. ............... | 384/279 |

* cited by examiner

*Primary Examiner*—William C. Joyce
(74) *Attorney, Agent, or Firm*—Wei Te Chung

(57) ABSTRACT

A combined bearing includes a main body (10) and a mating member (30). The main body is generally cylindrical, with an axial hole (16) and a cutout (18) defined therein. The cutout is generally semi-cylindrical and spans from an outer surface (14) of the main body to the axial hole of the main body. The mating member has a same configuration as the cutout of the main body and can be inserted into the cutout to provide a complete cylinder having the axial hole therein. The main body and the mating member are made of different materials, one is metal alloy which is capable of impregnating lubricant oil therein, the other is ceramic having high hardness. Thus, the combined bearing may combine the advantages of an oil impregnated bearing and the advantages of a ceramic bearing.

1 Claim, 4 Drawing Sheets

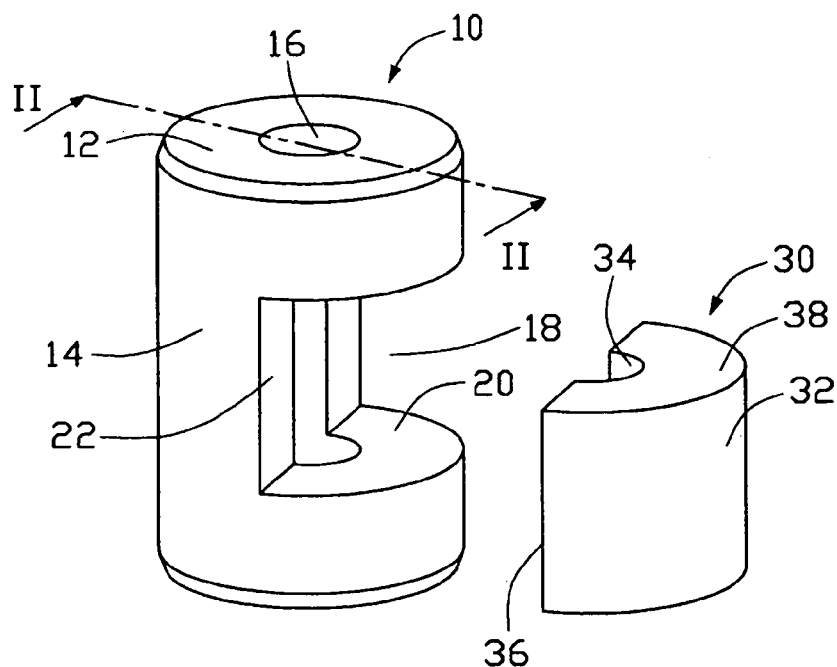
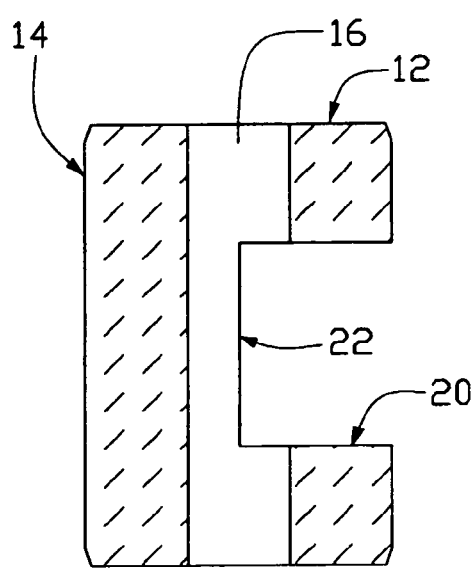
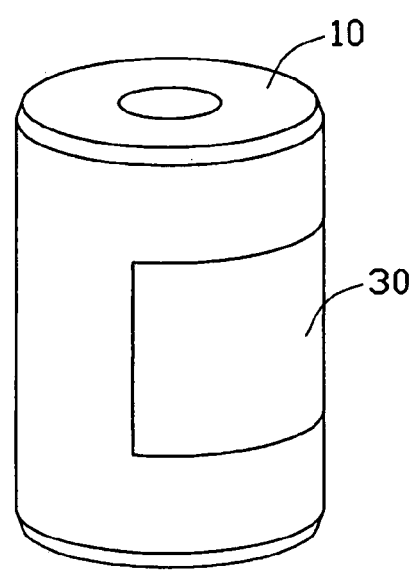
FIG. 1
FIG. 2
FIG. 3

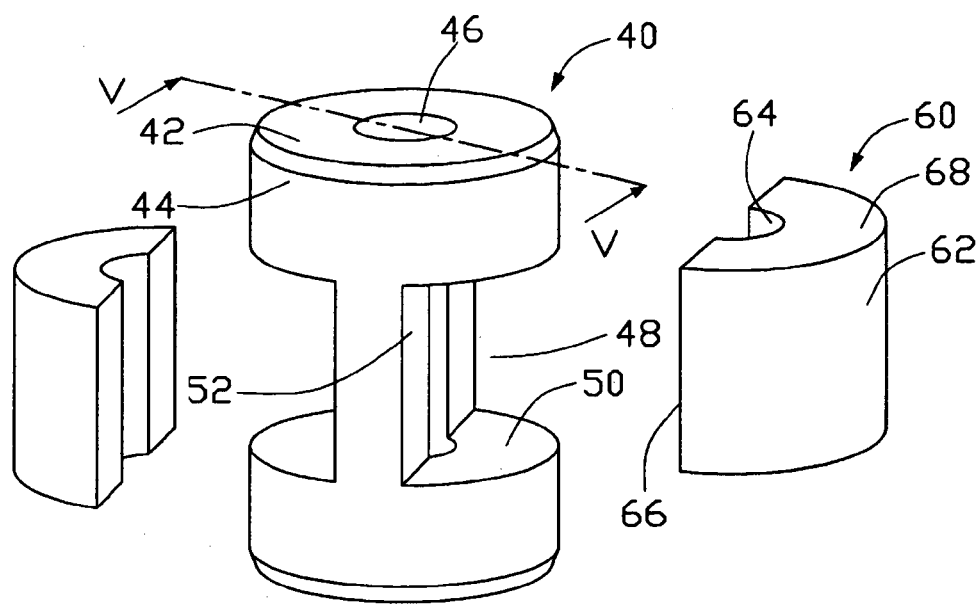
FIG. 4
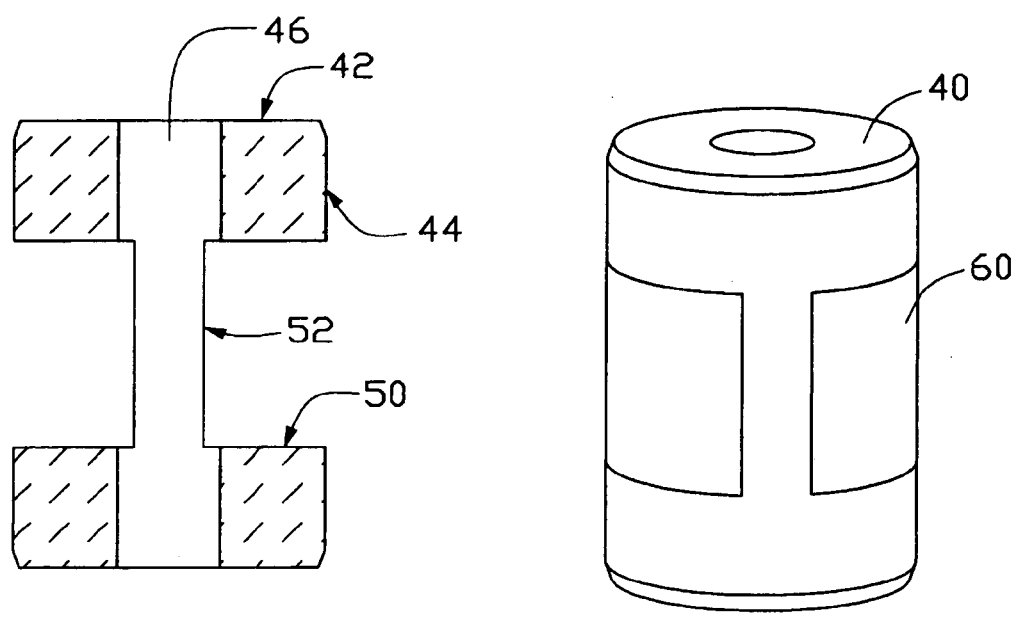
FIG. 5
FIG. 6

COMBINED BEARING

BACKGROUND OF THE INVENTION

1. Field of the Invention

The present invention relates to a bearing, and more particularly to a combined bearing having advantages of high hardness and self lubrication.

2. Description of Prior Art

A bearing is commonly used to reduce friction in a mechanical system. An oil impregnated bearing, ball bearing, or ceramic bearing is often used in an electric cooling fan. An oil impregnated bearing is commonly made of powdered bronze, an iron-copper based alloy or another metal alloy by a sintering process. The oil impregnated bearing is formed into a desired shape, and has a porous surface in which lubricant oil is impregnated and held by capillary action, in much the same way as water is held in a sponge. When a moving part such as a shaft or a pin moves against the bearing, impregnated oil is forced out and lubricates points of friction. A main advantage of the oil impregnated bearing is its ability to self lubricate over its working lifetime, at least under ideal conditions. However, the oil impregnated bearing is prone to easily wear out due to its low hardness, and may enjoy only a short working lifetime. A ceramic bearing is made of ceramic material, such as silicon nitride or zirconium oxide. The ceramic bearing has a relatively high hardness and a much longer lifetime than the oil impregnated bearing. However, the ceramic bearing has a highly dense surface, in which lubricant oils cannot be impregnated. Thus, great friction exists in the ceramic bearing, which makes it very difficult to start up an electric cooling fan employing the ceramic bearing. Moreover, once the ceramic bearing has been in service for an extended period of time, it is prone to generate much noise. A ball bearing commonly comprises an inner ring, an outer ring and a plurality of balls made of hardened steel or stainless steel between the inner and outer rings. The ball bearing is relatively costly to manufacture. In addition, it is prone to generate much noise once has been in service for an extended period of time.

SUMMARY OF THE INVENTION

Accordingly, an object of the present invention is to provide a bearing with low friction, self lubrication, and a long lifetime.

In order to achieve the object set above, a combined bearing according to a first preferred embodiment of the present invention includes a main body and a mating member. The main body is generally cylindrical, with an axial hole and a cutout defined therein. The cutout is generally semi-cylindrical and spans from an outer surface of the main body to the axial hole of the main body. The mating member has a same configuration as the cutout of the main body and can be inserted into the cutout to provide the complete combined bearing having the axial hole therein. The main body and the mating member are made of different materials, one is metal alloy which is capable of impregnating lubricant oil therein, the other is ceramic having high hardness. Thus, the combined bearing combines the advantages of an oil impregnated bearing and the advantages of a ceramic bearing.

Other objects, advantages and novel features of the present invention will become more apparent from the following detailed description when taken in conjunction with the accompanying drawings, in which:

BRIEF DESCRIPTION OF THE DRAWINGS

FIG. 1 is an exploded, perspective view of a combined bearing according to the first preferred embodiment of the invention, the combined bearing comprising a main body and a mating member;

FIG. 2 is a cross-sectional view of the main body of FIG. 1, taken along line II—II thereof;

FIG. 3 is an assembled view of FIG. 1;

FIG. 4 is an exploded, perspective view of a combined bearing according to a second preferred embodiment of the present invention, the combined comprising having a main body and two mating members;

FIG. 5 is a cross-sectional view of the main body of FIG. 4, taken along line V—V thereof;

FIG. 6 is an assembled view of FIG. 4, but viewed from a slightly different aspect;

DETAILED DESCRIPTION OF PREFERRED EMBODIMENTS OF THE INVENTION

Figure 7:
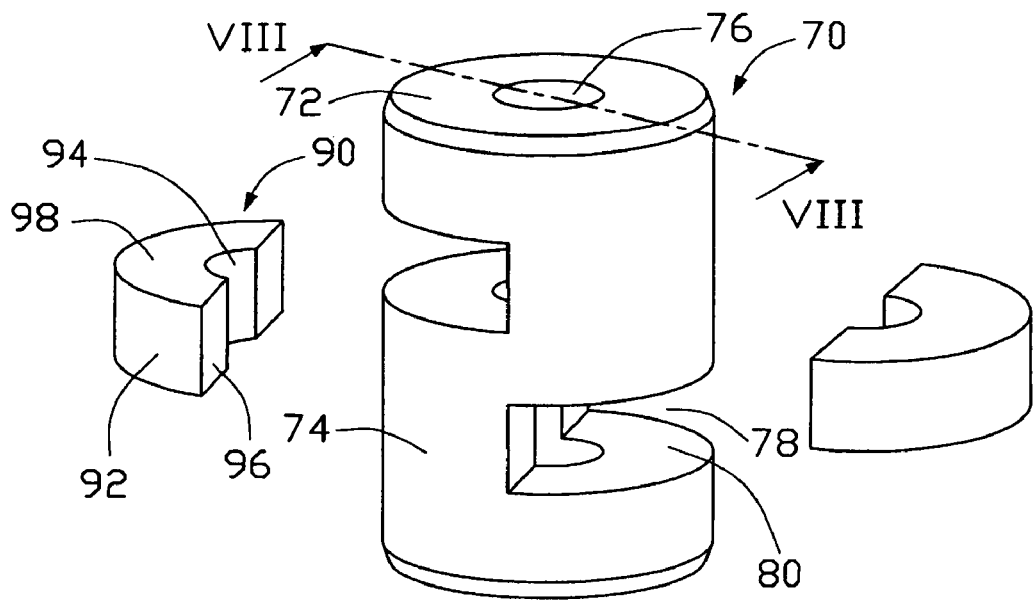
FIG. 7 is an exploded, perspective view of a combined bearing according to a third preferred embodiment of the present invention, the combined comprising having a main body and two mating members.

Referring to FIGS. 1 through 3, a combined bearing (not labeled) according to the first preferred embodiment of the present invention comprises a main body 10 and a mating member 30. The main body 10 is generally cylindrical, with an axial hole 16 and a semi-cylindrical cutout 18 defined therein. The main body 10 comprises an annular top surface 12, an annular bottom surface (not labeled), and an outer cylindrical surface 14. The axial hole 16 is cylindrical, and is for receiving a rotatable shaft (not shown) therein. Thus, the main body 10 defines an inner cylindrical surface (not labeled) at the axial hole 16 which contacts the shaft rotating therein.

The semi-cylindrical cutout 18 spans from the outer cylindrical surface 14 to the inner cylindrical surface. Thus the main body 10 forms two coplanar rectangular surfaces 22 parallel to the axial hole 16, and two parallel semi-annular limiting surfaces 20 perpendicular to the axial hole 16.

The mating member 30 is semi-cylindrical, and comprises an inner curved surface 34 having a radius of curvature identical to that of the axial hole 16, an outer curved surface 32 having a radius of curvature identical to that of the outer cylindrical surface 14, two coplanar rectangular mating surfaces 36 identical in configuration to the rectangular surfaces 22 of the main body 10, and two parallel semi-annular surfaces 38 identical in configuration to the limiting surfaces 20 of the main body 10. The mating member 30 has the same configuration as the cutout 18, and can be inserted into the cutout 18 so as to provide a complete cylinder having the axial hole 16 therein.

As shown in FIG. 3, when the mating member 30 is inserted into the cutout 18, the outer curved surface 32 of the mating member 30 complements the outer cylindrical surface 14 of the main body 10 to provide a complete outer surface. The inner curved surface 34 of the mating member 30 cooperates with the inner cylindrical surface of the main body 10 to provide a complete bearing surface for bearing the shaft received in the axial hole 16. The parallel limiting surfaces 20 of the main body 10 confine the mating member 30 in the cutout 18, and prevent the mating member 30 from moving along axial directions of the cylinder. The rectangular surfaces 22 of the main body 10 mate with the mating surfaces 36 of the mating member 30. The combined bearing is thus formed.

The main body 10 is made of ceramic material having high hardness. The mating member 30 is made of metal alloy, and has a porous surface in which lubricant oil can be impregnated and held by capillary action. The ceramic material can be made of aluminum oxide ($Al_2O_3$) or silicon oxide ($SiO_2$). The metal alloy can be an iron-copper based alloy, made from an iron-copper based metal powder by a sintering process.

In operation, the shaft is rotatably received in the combined bearing. When the shaft rotates, impregnated lubricant oil held by the mating member 30 is forced out and lubricates the interface between the shaft and the combined bearing. In addition, because the main body 10 has highly hardness, the combined bearing can endure friction from the shaft without sustaining significant wear. Thus, the combined bearing may have the advantages of low friction, minimal wear, a long lifetime, and easy start-up.

Referring to FIGS. 4 through 6, a combined bearing in accordance with a second preferred embodiment of the present invention comprises a main body 40 and two mating members 60. The main body 40 is generally cylindrical, with an axial hole 46 and two cutouts 48 defined therein. Each cutout 48 has a generally arcuate configuration. The main body 40 comprises an annular top surface 42, an annular bottom surface (not labeled), and an outer cylindrical surface 44. The axial hole 46 is cylindrical, and is for receiving a rotatable shaft (not shown) therein. Thus, the main body 40 defines an inner cylindrical surface (not labeled) at the axial hole 46 which contacts the shaft rotating therein.

Each cutout 48 spans from the outer cylindrical surface 44 to the inner cylindrical surface, with the cutouts 48 being symmetrically opposite each other. Thus the main body 40 forms two pairs of coplanar rectangular surfaces 52 parallel to the axial hole 46, and two pairs of parallel limiting surfaces 50 perpendicular to the axial hole 46. Each limiting surface 50 has a generally arcuate configuration.

Each mating member 60 has a generally arcuate configuration, and comprises an inner curved surface 64 having a radius of curvature identical to that of the axial hole 46, an outer curved surface 62 having a radius of curvature identical to that of the outer cylindrical surface 44, two coplanar rectangular mating surfaces 66 identical in configuration to corresponding rectangular surfaces 52 of the main body 40, and two parallel generally arcuate surfaces 68 identical in configuration to corresponding limiting surfaces 50 of the main body 40. The mating members 60 each have the same configuration as each of the cutouts 48, and can be inserted into the cutouts 48 so as to provide a complete cylinder having the axial hole 46 therein.

Figures 8, 9:
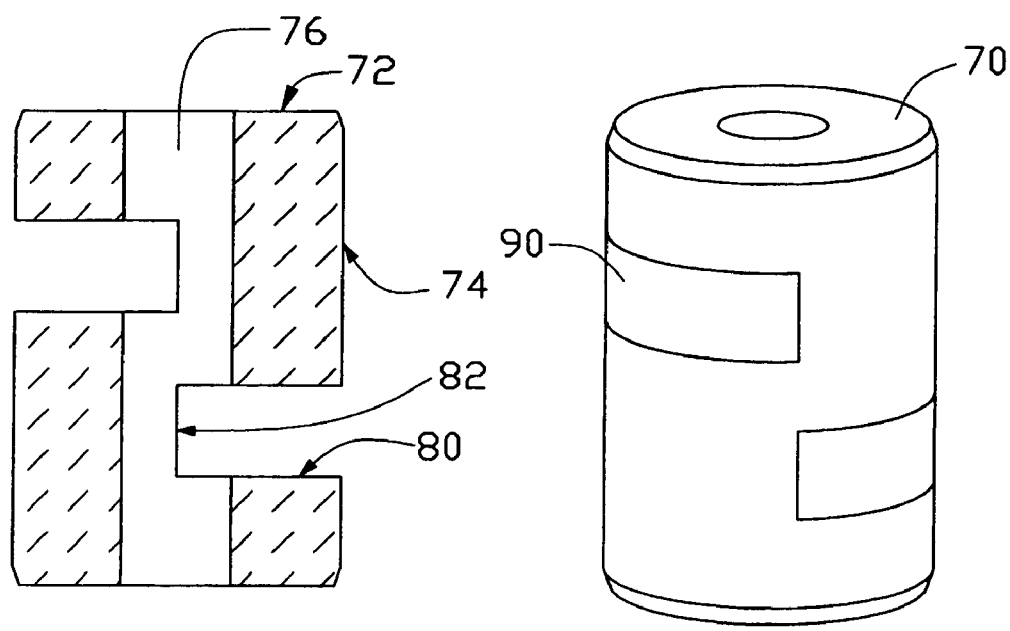
FIG. 8 is a cross-sectional view of the main body of FIG. 7, taken along line VIII—VIII thereof.
FIG. 9 is an assembled view of FIG. 7, but viewed from a slightly different aspect.

Referring to FIGS. 7 through 9, a combined bearing in accordance with a third preferred embodiment of the present invention comprises a main body 70 and two mating members 90. The main body 70 is generally cylindrical, with an axial hole 76 and two semi-cylindrical cutouts 78 defined therein. The main body 70 comprises an annular top surface 72, an annular bottom surface (not labeled), and an outer cylindrical surface 74. The axial hole 76 is cylindrical, and is for receiving a rotatable shaft (not shown) therein. Thus, the main body 70 defines an inner cylindrical surface (not labeled) at the axial hole 76 which contacts the shaft rotating therein.

Each semi-cylindrical cutout 78 spans from the outer cylindrical surface 74 to the inner cylindrical surface. The semi-cylindrical cutouts 78 are generally symmetrically opposite each other, but are offset from each other at different heights along the axis of the main body 70. Thus the main body 70 forms two pairs of coplanar rectangular surfaces 82 parallel to the axial hole 76, and two pairs of parallel semi-annular limiting surfaces 80 perpendicular to the axial hole 76.

Each mating member 90 is semi-cylindrical, and comprises an inner curved surface 94 having a radius of curvature identical to that of the axial hole 76, an outer curved surface 92 having a radius of curvature identical to that of the outer cylindrical surface 74, two coplanar rectangular mating surfaces 96 identical in configuration to corresponding rectangular surfaces 82 of the main body 70, and two parallel semi-annular surfaces 98 identical in configuration to corresponding limiting surfaces 80 of the main body 70. The mating members 90 each have the same configuration as each of the cutouts 78, and can be inserted into the cutouts 78 so as to provide a complete cylinder having the axial hole 76 therein.

Figure 10:
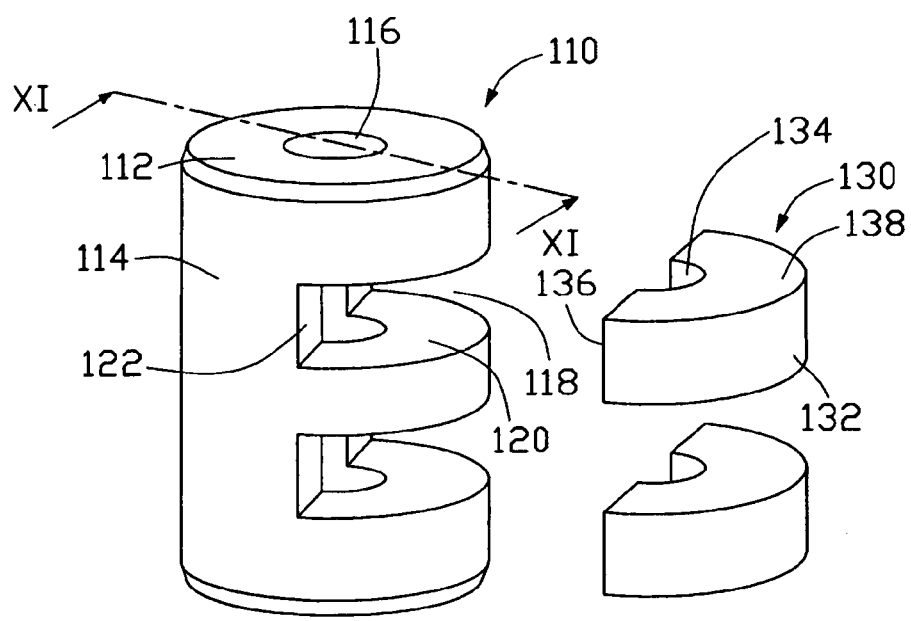
FIG. 10 is an exploded, perspective view of a combined bearing according to a fourth preferred embodiment of the present invention, the combined bearing comprising a main body and two mating members.
Figure 11:
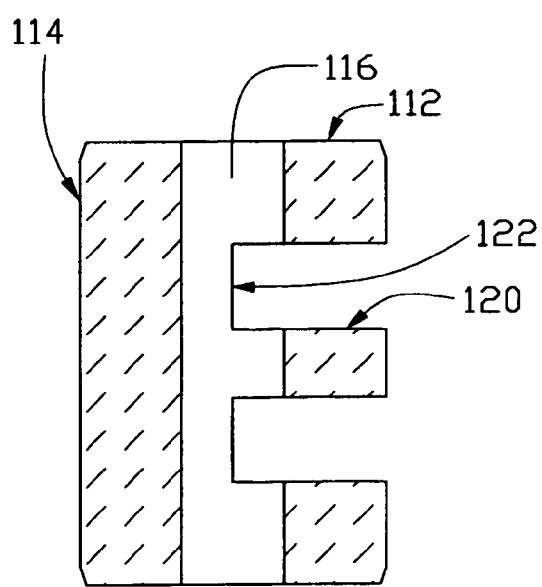
FIG. 11 is a cross-sectional view of the main body of FIG. 10, taken along line XI—XI thereof.
Figure 12:
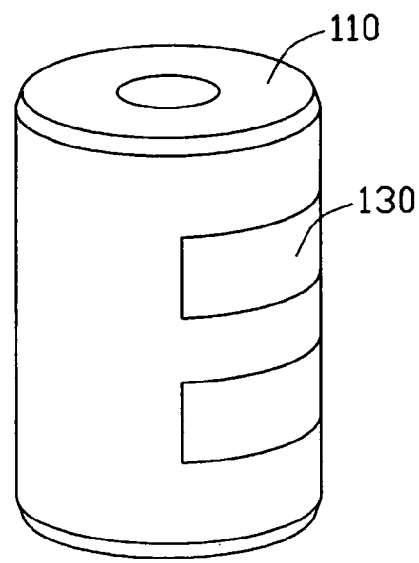
FIG. 12 is an assembled view of FIG. 10, but viewed from a slightly different aspect.

Referring to FIGS. 10 through 12, a combined bearing in accordance with a fourth preferred embodiment of the present invention comprises a main body 110 and two mating members 130. The main body 110 is generally cylindrical, with an axial hole 116 and two semi-cylindrical cutouts 118 defined therein. The main body 110 comprises an annular top surface 112, an annular bottom surface (not labeled), and an outer cylindrical surface 114. The axial hole 116 is cylindrical, and is for receiving a rotatable shaft (not shown) therein. Thus, the main body 110 defines an inner cylindrical surface (not labeled) at the axial hole 116 which contacts the shaft rotating therein.

Each semi-cylindrical cutout 118 spans from the outer cylindrical surface 114 to the inner cylindrical surface. The semi-cylindrical cutouts 118 are disposed at a same side of the main body 110, at different heights one above the other. Thus the main body 110 forms two pairs of coplanar rectangular surfaces 122 parallel to the axial hole 116, and two pairs of parallel semi-annular limiting surfaces 120 perpendicular to the axial hole 116.

Each mating member 130 is semi-cylindrical, and comprises an inner curved surface 134 having a radius of curvature identical to that of the axial hole 116, an outer curved surface 132 having a radius of curvature identical to that of the outer cylindrical surface 114, two coplanar rectangular mating surfaces 136 identical in configuration to corresponding rectangular surfaces 122 of the main body 110, and two parallel semi-annular surfaces 138 identical in configuration to corresponding limiting surfaces 120 of the main body 110. The mating members 130 each have the same configuration as each of the cutouts 118, and can be inserted into the cutouts 118 so as to provide a complete cylinder having the axial hole 116 therein.

In all the above embodiments, the combined bearing having the mating member(s) inserted into the main body has both the advantages of a ceramic bearing and the advantages of an oil impregnated bearing. Therefore the combined bearing has reduced friction, and a longer working lifetime.

It is noted that the materials of the main body and the mating member(s) of the combined bearing may be interchanged. That is, the main body may be made of metal alloy, and the mating member(s) may be made of ceramic material.

It is also noted that the ceramic material is not limited to $Al_2O_3$ or $SiO_2$. Other suitable ceramic materials may be used. Further, the metal alloy is not limited to an ion-copper based alloy. Other suitable metal alloys may also be used.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:
1. A combined bearing comprising:
a cylindrical main body defining an axial hole and a plurality of cutouts in communication with said axial hole at different axial positions, each of said cutouts radially extending through said main body within a 180 degree range; and
a plurality of mating members compliantly received in the corresponding cutouts, respectively, each of said mating members defining an inner curved surface conformable to said axial hole and an outer curved surface conformable to an exterior surface of said main body, wherein
at least one of said main body and said mating members is made of ceramic material while the rest is/are made of metal alloy.

* * * * *